United States Patent
Meier et al.

(10) Patent No.: US 7,148,318 B2
(45) Date of Patent: Dec. 12, 2006

(54) METHOD FOR PRODUCING POLYTETRAHYDROFURANE HAVING A LOW COLOR INDICES

(75) Inventors: Anton Meier, Kapellen (BE); Volkmar Menger, Neustadt (DE); Christoph Sigwart, Schriesheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 145 days.

(21) Appl. No.: 10/515,208

(22) PCT Filed: May 19, 2003

(86) PCT No.: PCT/EP03/05234

§ 371 (c)(1),
(2), (4) Date: Nov. 22, 2004

(87) PCT Pub. No.: WO03/099905

PCT Pub. Date: Dec. 4, 2003

(65) Prior Publication Data

US 2005/0182238 A1  Aug. 18, 2005

(30) Foreign Application Priority Data

May 24, 2002  (DE) ............................. 102 23 067

(51) Int. Cl.
*C08G 65/20* (2006.01)
*C08G 65/26* (2006.01)
*C07D 307/08* (2006.01)

(52) U.S. Cl. .................. 528/408; 528/405; 528/417; 549/429; 549/509

(58) Field of Classification Search ............. 528/405, 528/408, 417; 549/429, 509
See application file for complete search history.

(56) References Cited

U.S. PATENT DOCUMENTS

| 4,257,961 A | 3/1981 | Coates |
| 5,516,851 A | 5/1996 | Flick et al. |
| 5,936,126 A | 8/1999 | Ruehl et al. |
| 6,121,188 A | 9/2000 | Breitscheidel et al. |
| 6,201,137 B1 | 3/2001 | Nakaoka et al. |

FOREIGN PATENT DOCUMENTS

| DE | 28 01 792 | 7/1979 |
| EP | 041 790 | 12/1981 |
| EP | 653 243 | 5/1995 |
| EP | 813 906 | 12/1997 |
| EP | 842 699 | 5/1998 |
| JP | 61-200979 | 9/1986 |

*Primary Examiner*—Bernard Dentz
(74) *Attorney, Agent, or Firm*—Novak Druce & Quigg, LLP

(57) ABSTRACT

The invention provides a process for preparing polytetrahydrofuran, tetrahydrofuran copolymers, their monoesters or diesters and the monoesters or diesters of polytetrahydrofuran having a low color number in the presence of a catalyst, which comprises converting crude tetrahydrofuran which has been prepared in a manner per se into pure tetrahydrofuran by distillation, subsequently subjecting the latter to essentially complete hydrogenation and using the high-purity tetrahydrofuran obtained in this way for the polymerization directly after its preparation.

5 Claims, No Drawings

METHOD FOR PRODUCING POLYTETRAHYDROFURANE HAVING A LOW COLOR INDICES

This application is a 371 of PCT/EP03/05234 filed May 19, 2003.

The invention relates to a process for preparing polytetrahydrofuran, tetrahydrofuran copolymers, their monoesters or diesters and the monoesters or diesters of polytetrahydrofuran having a low color number.

Polytetrahydrofuran, hereinafter referred to as PTHF for short, which is also known as polyoxybutylene glycol, is used as a versatile intermediate in the plastics and synthetic fibers industry and is employed, inter alia, for producing polyurethane elastomers, polyester elastomers and polyamide elastomers. In addition, it is, like some of its derivatives, a valuable auxiliary in many applications, for example as dispersant or in the deinking of waste paper.

PTHF is usually prepared industrially by polymerization of tetrahydrofuran, hereinafter referred to as THF for short, over suitable catalysts. Addition of appropriate reagents enables the chain length of the polymer chains to be controlled and thus enables the mean molecular weight to be set to the desired value. Such reagents are known as chain termination reagents or "telogens". Control is achieved by selection of type and amount of the telogen. Selection of appropriate telogens enables additional functional groups to be introduced at one end or both ends of the polymer chain. Thus, for example, use of carboxylic acids or carboxylic anhydrides as telogens makes it possible to prepare the monoesters or diesters of PTHF. Other telogens act not only as chain termination reagents, but are also incorporated into the growing polymer chain of the PTHF. They not only have the function of a telogen but are simultaneously a comonomer and can therefore equally well be referred to as telogens or comonomers. Examples of such comonomers are telogens having two hydroxy groups, e.g. dialcohols. These can be, for example, ethylene glycol, propylene glycol, butylene glycol, 1,4-butanediol, 2-butyne-1,4-diol, 1,6-hexanediol or low molecular weight PTHF. Further suitable comonomers are 1,2-alkylene oxides, for example ethylene oxide or propylene oxide, 2-methyltetrahydrofuran or 3-methyltetrahydrofuran. The use of such comonomers leads to the preparation of tetrahydrofuran copolymers and in this way makes it possible to modify PTHF chemically.

Acid catalysts are suitable as catalysts for the polymerization of THF to PTHF on a production scale. However, these have the disadvantage that the polymers obtained can have a yellow to brownish discoloration. Such discoloration depends on the production parameters, e.g. the temperature, and in particular on the quality of the THF used. Technical-grade THF contains various impurities in concentrations of from 10 to 1000 ppm. A higher impurity content leads to the abovementioned discoloration in the polymerization of THF. The disadvantageous discoloration is accompanied by reduced reactivity in the preparation of polyesters or polyurethanes from PTHF.

It has hitherto not been completely clear which impurities contribute to occurrence of the color and to what extent. The adverse effect of aldehydes such as propionaldehyde and butyraldehyde has been known for some time. Likewise, dihydrofuran can lead to discoloration. Furthermore, THF hydroperoxides also lead to discoloration during the polymerization. These peroxides are easily formed by reaction of THF with oxygen. The formation of these undesirable peroxides can occur during the preparation of THF, during its purification by distillation or during storage prior to polymerization to form PTHF. For this reason, pure THF is prepared and stored under inert gas in order to minimize contact of the THF with oxygen. This is usually done on a production scale using technical-grade nitrogen which contains 10–200 ppm of oxygen as impurity. Highly pure oxygen-free nitrogen or another oxygen-free inert gas such as argon would be advantageous here, but would lead to considerably higher costs. When THF is stored in a nitrogen-blanketed tank, there is a risk of technical malfunctions leading to entry of small amounts of air. This leads to contamination of the THF with oxygen and thus to formation of peroxides.

Various efforts have therefore been made in the prior art to pretreat the technical-grade THF used for polymerization in such a way that the concentration of impurities is reduced. Thus, DE-A-2 801 792 discloses treatment of THF with strong mineral acids, organic sulfonic acids, silica gel and/or bleaching earth prior to polymerization, as a result of which polymers having an improved color number are obtained. However, it has been found that this treatment method cannot be applied reproducibly to any available technical grade of THF in every case.

JP-A-61-200979 describes a process for preparing pure THF from technical-grade THF which contains at least n-butyraldehyde and dihydrofuran as impurities. Water, for example, can be present as additional impurity. It is stated in the publication that the impurities are present in concentrations of about 500 ppm. Conversion of this technical-grade THF, which will hereinafter be referred to as crude THF for the purposes of the present invention, is carried out by hydrogenation in the presence of a suitable catalyst. After this hydrogenation, the reaction product obtained in this way is purified by distillation and in the process also freed of any water present. The THF obtained after the hydrogenation and subsequent distillation has a purity of 99.9% and still contains small amounts of n-butyraldehyde and dihydrofuran. These impurities cannot be completely eliminated by this procedure.

U.S. Pat. No. 4,257,961 describes a process in which crude THF prepared by the Reppe process (acetylene and formaldehyde) is purified in a multistage distillation. During this multistage distillation, the concentration of methacrolein, dihydrofuran, propionaldehyde and butyraldehyde is reduced by means of a hydrogenation step. The hydrogenation is carried out using Raney nickel (suspension) as catalyst. The hydrogenation products formed are removed in a subsequent distillation. As the experimental results presented show, this reduces the concentration of the interfering substances. Complete elimination is not achieved.

Furthermore, various processes for preparing high-purity THF by means of complicated distillation methods are known from the prior art. However, because of the similar boiling points, complete removal of the impurities is not possible even when using a large number of theoretical plates in the distillation.

The use of THF having a low oxygen content for the preparation of PTHF having a reduced color number is described, for example, in JP 84-264636. This describes the polymerization of THF under an inert gas atmosphere, with the oxygen concentration in the starting materials being below 30 ppm.

None of the above-described processes succeeds in completely removing (<1 ppm per substance) the interfering impurities such as aldehydes, dihydrofuran, oxygen, methacrolein and THF hydroperoxides and thus supplying the PTHF production process with a THF which is virtually free of these impurities. However, even small amounts of these impurities have an influence on the color number of the PTHF.

It is an object of the present invention to provide a simple and inexpensive process for preparing high-purity THF which is essentially free fo these impurities. The process should be suitable for preparing PTHF having a very low color number and for preparing THF copolymers, their monoesters and dvesters and the monoesters and dvesters of PTHF. For the purposes of the present invention, high-purity THF is THF which is essentially free of aldehydes, dihydrofuran, methacrolein, oxyghen and THF peroxides. In this context, "essentially free" of these interfering impurities means that they are each present in an amount of <1 ppm.

We have found that this object is achieved by a process in which crude tetrahydrofuran which has been prepared in a manner known per se is converted by distillation into pure tetrahydrofuran, the latter is subsequently subjected to essentially complete hydrogenation and the high-purity tetrahydrofuran obtained in this way is used for polymerization directly after its preparation.

Firstly, crude tetrahydrofuran which has been prepared in a manner known per se is converted by distillation into pure tetrahydrofuran. Suitable distillation processes are known, for example, from DE 37 26 805. This distillation gives pure tetrahydrofuran having a purity of >99.9% and a total content of "unsaturated", interfering impurities such as aldehydes, dihydrofuran, peroxides, oxygen of not more than 500 ppm in total, preferably not more than 200 ppm, particularly preferably not more than 100 ppm. Pure tetrahydrofuran may, in addition to the abovementioned unsaturated, interferring impurities, comprise not more than 500 ppm of other impurities such as butyrolactone, butanediol, butanol, preferably not more than 200 ppm, particularly preferably not more than 100 ppm.

This pure tetrahydrofuran is subjected to a hydrogenation in which the abovementioned interfering, color-imparting impurities are essentially completely eliminated by chemical reaction.

The term "essentially complete hydrogenation" here refers to removal of the abovementioned interfering compounds down to <1 ppm per substance.

However, direct use of the hydrogenated THF for polymerization according to this process is only possible when the secondary components formed in the hydrogenation by conversion of the interfering compounds are formed in sufficiently small amounts for them to have no adverse effect on the polymerization reaction and on the quality of the PTHF. Such secondary components formed in the hydrogenation can be, for example:

n-butanol (hydrogenation of n-butyraldehyde)
isobutanol (hydrogenation of isobutyraldehyde)
propanol (hydrogenation of propionaldehyde)

These secondary components are formed in the hydrogenation in the same amount as the corresponding aldehydes are consumed. The total amount of secondary components is therefore not increased by this reaction. The hydrogenation of dihydrofuran and of THF hydroperoxide does not influence the amount of secondary components, since THF is formed in each case.

The aldehydes, dihydrofuran and peroxides present in the pure THF have to be converted completely into the corresponding hydrogenation products, for example alcohols and THF, in the hydrogenation. In addition, no appreciable secondary reactions (e.g. hydrogenation of THF to butanol) should occur.

This requires the use of selective and appropriate heterogeneous catalysts and mild hydrogenation conditions. The hydrogenation products and the compounds from secondary reactions are then present in such small amounts that in the polymerization of the THF to PTHF they have no adverse effect on the product quality of the polymer.

Catalysts suitable for the hydrogenation according to the present invention comprise, in particular, elements or compounds of elements selected from the group consisting of transition metals of groups 7 to 11 of the Periodic Table of the Elements. Examples of such elements are ruthenium, rhenium, nickel, iron, copper, cobalt, palladium and platinum. Mixtures or alloys of various elements can also be present. In this case, elements from transition groups 6 and 10 of the Periodic Table of the Elements, e.g. chromium, molybdenum or zinc, may be present in addition to the abovementioned elements.

When catalysts comprising base metals such as iron, cobalt, nickel or copper are used, it is advantageous to reduce them, i.e. convert them into the active form, before use. This can be carried out by methods known to those skilled in the art, preferably by means of hydrogen. Activation of the catalyst prior to the hydrogenation is generally the preferred variant.

The catalysts can also have been applied to a suitable support. Here, it is in principle possible to use all supports known for catalyst production, e.g. supports comprising aluminum oxide, silicon oxide, pumice, bentonite, magnesium silicate, titanium oxide, zirconium oxide, zinc oxide, magnesium oxide, silicon carbide, activated carbon, mullite, cordierite or mixtures thereof. The hydrogenation-active components can be prepared, for example, by coprecipitation of soluble compounds of hydrogenation metal and support or by application of soluble compounds of hydrogenation metal to a prefabricated support by precipitation, spraying or impregnation. Aqueous solutions of metal salts are particularly useful for application of the active components by impregnation, spraying or other suitable methods.

Suitable metal salts of transition groups 7–11 of the Periodic Table of the Elements are nitrates, nitrosyl nitrates, halides, carbonates, carboxylates, acetylacetonates, chloro complexes, nitro complexes or amine complexes of the corresponding metals. In the case of catalysts comprising a plurality of metals of transition groups 7–11 of the Periodic Table of the Elements, the metal salts or their solutions can be applied simultaneously or in succession. The supports which have been coated or impregnated with metal salt solutions are then usually dried (preferably at from 100° C. to 150° C.) and calcined if appropriate (preferably at from 200° C. to 600° C.).

The coated and dried and optionally calcined supports can then be activated by treatment in a gas stream comprising free hydrogen. The gas stream preferably comprises 50–100% by volume of hydrogen and 0–50% by volume of nitrogen.

Furthermore, macroporous support materials are also well suited to the process of the present invention. The term macroporous catalysts generally refers to systems containing a proportion of >10% of pores having a diameter of >100 nm. In principle, all support materials known for the production of macroporous catalysts can be used for this purpose.

Such macroporous catalysts for the hydrogenation of C—C multiple bonds in oligomers and polymers has been described in a number of patents such as EP 813 906, EP 0653243 or EP 842699. These documents also give information on the production of such systems.

Prefered catalysts also include ones in which the hydrogenation-active components have been applied as an outer shell to a support. This has the advantage that generally less active composition has to be present for the same activity. The general term for these catalysts is "coated catalysts". A special case is when the active composition has been applied to a solid woven material. This woven material can, for example, be a metal mesh which has been treated with oxygen to provide it with a surface coating of, for example, aluminum oxide which in turn acts as support for, for example, palladium.

All usable catalysts in principle be employed in the form of powders, for example when the process is carried out as a suspension process, or advantageously as shaped bodies, e.g. in the form of extrudates, cylinders, spheres, rings or granules, in particular for a fixed bed arrangement of the catalyst, in the process of the present invention.

The hydrogenation according to the present invention can in principle be carried out batchwise or continuously, with continuous operation generally being preferred for economic reasons. The hydrogenation can be carried out in conventional continuous-process reactors or reactor assemblies and can be carried out in a suspension or fixed-bed mode, for example in loop reactors or stirred reactors in the case of the suspension mode or in tube reactors or fixed-bed reactors in the case of the fixed-bed mode.

The hydrogenation of the pure tetrahydrofuran is carried out at from 20 to 300° C., preferably from 20 to 200° C., particularly preferably from 50 to 100° C., and a pressure of from 1 to 300 bar, preferably from 1 to 100 bar, particularly preferably from 1 to 20 bar.

In continuous operation, the space velocity over the catalyst is usually from 0.02 to 1.0 kg of THF/(l of catalyst * h), preferably from 0.02 to 0.5 kg of THF/(l of catalyst * h), particularly preferably from 0.05 to 0.25 kg of THF/(l of catalyst * h). As hydrogenation gases, it is possible to use any gases which comprise free hydrogen and contain no harmful amounts of catalyst poisons, for example carbon monoxide. Preference is given to using pure hydrogen as hydrogenation gas.

These mild reaction conditions and, in particular, the very short residence times offer considerable advantages in an industrial hydrogenation, since only a small reactor designed for low temperatures and a low pressure is required.

In a particularly preferred embodiment, the hydrogenation is carried out continuously over fixed-bed catalysts in the downflow or upflow mode without backmixing. This is an excellent way of achieving the conversion of interferring impurities necessary to achieve the effect according to the present invention using very simple and therefore inexpensive hydrogenation apparatus. Furthermore, no appreciable secondary reactions which would lead to an increase in the secondary components in the hydrogenation product occur under the abovementioned mild hydrogenation conditions.

In a further particularly preferred embodiment of this process, the THF is used for the polymerization to PTHF immediately after the hydrogenation without further treatment and without intermediate storage. In this case, no particular engineering precautions, e.g. a particularly oxygen-free inert gas, are necessary to avoid contamination with oxygen.

Since complete conversions are not usually obtained in THF polymerization using the customary polymerization catalysts, excess THF is usually separated off by distillation after the polymerization and recirculated to the process.

In a further particularly preferred embodiment of this process, the THF which has been separated off after the polymerization and recirculated is mixed with fresh pure tetrahydrofuran, passed to the hydrogenation of the process of the present invention and then used for polymerization.

In addition, the polymerization can be carried out in the presence of at least one telogen and/or comonomer. The choice of suitable telogen and/or comonomer is determined by the product desired in the particular case and is a matter familier to a person skilled in the art. In a particular embodiment of the process of the present invention, pure tetrahydrofuran is hydrogenated together with a telogen and/or comonomer. In this case, care has to be taken to ensure that the telogen is not altered in the hydrogenation. In a further embodiment of the process of the present invention, the polymerization is carried out by means of acetic anhydride as telogen, with both the pure tetrahydrofuran and the acetic anhydride being hydrogenated together or separately prior to the polymerization. As a result, the impurities which lead to poor color numbers are brought down to a concentration of <1 ppm in both starting materials, viz. the acetic anhydride and the tetrahydrofuran.

The invention is illustrated below by means of examples.

EXAMPLES

A: Production of the Catalysts used for the Examples

Catalyst Example 1

Production of Catalyst A

Silicon dioxide in extrudate form (4 mm, BET surface area=140 m$^2$/g) was steeped twice in an excess of a solution of nickel nitrate, copper nitrate and manganese nitrate and phosphoric acid (9.2% by weight of Ni, 3.2% by weight of Cu, 0.8% by weight of Mn and 0.65% by weight of phosphoric acid) for 15 minutes each time. After each impregnation, the extrudates were dried at 120° C. and heat treated at 630° C. The catalyst A comprised 21% by weight of NiO, 7.3% by weight of CuO, 2% by weight of $Mn_3O_4$ and 1.2% by weight.

Catalyst Example 2

Production of Catalyst B 47 g of an aqueous palladium nitrate solution (11% by weight of palladium) were diluted with 680 ml of water and sprayed onto 2253 g of a macroporous aluminum support in extrudate form (4 mm extrudes, alpha-$Al_2O_3$, BET surface area=8 m$^2$/g). Drying and heat treatment were carried out as described for catalyst A. The catalyst B contained 0.22% by weight of palladium.

Catalyst Example 3

Production of Catalyst C 13.8 g of an aqueous palladium nitrate solution (11% by weight of palladium) were diluted with 420 ml of water and sprayed onto 730 g of a macroporous aluminum support in the form of spheres (2–4 mm spheres, gamma-$Al_2O_3$, BET surface area=230 m$^2$/g). Drying and heat treatment were carried out as described for catalyst A. The catalyst C contained 0.21% by weight of palladium.

Catalyst Example 4

Production of Catalyst D 19.8 g of an aqueous palladium nitrate solutin (11% by weight of palladium) were diluted with 1000 ml of water and sprayed onto 1042 g of a macroporous aluminum support in extrudate form (1.5 mm extrudates, gamma/theta-$Al_2O_3$, BET surface area=85 $m^2/g$). Drying and heat treatment were carried out as described for catalyst A. The catalyst D contained 0.22% by weight of palladium.

Catalyst Example 5

Production of Catalyst E 3255 g of an aqueous palladium nitrate solution (11% by weight of palladium) were diluted with 79 ml of water and sprayed onto 140 kg of an aluminum support in the form of spheres (1.5 mm extrudates, gamma-$Al_2O_3$, BET surface area=230 $m^2/g$). Drying was carried out at 120° C. and subsequent heat treatment was carried out for 6 hours at 300° C. The catalyst G contained 0.72% by weight of palladium.

Catalyst Example 6

Production of Catalyst F 72.7 g of a palladium nitrate solution (11% by weight of palladium) were admixed with 4000 ml of water and 100 g of a high molecular weight sodium polyacrylate (Aqualic, from BASF). After 60 minutes, the gel-like mass obtained was kneaded with 5527 g of pseudoboehmite in a Mix-Muller for 70 minutes. During this time, 200 g of a 25% strength aqueous ammonia solution and 900 ml of water were added. The mass was shaped in an extruder to give 4 mmm extrudates which were subsequently dried at 120° C. and then heated at 500° C. for one hour. The catalyst A contained 0.21% by weight of palladium. The BET surface area was 235 $m^2/g$.

Catalyst Example 7

Production of Catalyst G

Catalyst G is produced by precipitation of a solution of copper nitrate and aluminum nitrate by means of sodium carbonate solution. The precipitate formed is filtered off, washed and dried at 120° C. The dried powder is calcined at 250° C. for 2 hours and then pressed to form pellets having a diameter of 5 mm. These pellets are heated at 580° C. for 2 hours. The finished catalyst comprises 53% of CuO and 47% of $Al_2O_3$.

B: Preparation of Pure Tetrahydrofuran

Pure tetrahydrofuran was prepared in a manner known per se from a tetrahydrofuran/water mixture by means of the process described in the example of DE 37 26 805.

This pure tetrahydrofuran had a purity of >99.9% and contained the following impurities:

| | |
|---|---|
| methacrolein | 25 ppm |
| n-butyraldehyde | 11 ppm |
| isobutyraldehyde | 8 ppm |
| 2,3-dihydrofuran | 12 ppm |
| 2,5-dihydrofuran | 6 ppm |
| THF hydroperoxide | 3 ppm |
| others | 21 ppm |

For the purposes of the present patent application, "others" encompasses impurities such as n-butanol, γ-butyrolactone or methyltetrahydrofuran which have been shown to have no influence on the color number of the PTHF formed and which are not altered in the hydrogenation of THF.

B. Hydrogenation of Pure Tetrahydrofuran using Catalyst A

The hydrogenation of the pure tetrahydrofuran obtained as described under B) was carried out in a continuous operated 1 l hydrogenation reactor using various catalysts.

In all experiments, the reactor was charged with 300 ml of catalyst A. 3600 ml/h (5 min residence time), 1200 ml/h (15 min residence time) or 400 ml/h (45 min residence time) of pure tetrahydrofuran and 10 l/h of hydrogen were then fed in. The hydrogenation conditions and also the residence times and the concentration of impurities in the high-purity tetrahydrofuran are shown in Table 1.

C. Hydrogenation of Pure Tetrahydrofuran using Various Catalysts

The hydrogenation was carried out using the pure tetrahydrofuran described under B) and various catalysts in a continuously operated 1 l hydrogenation reactor.

In all experiments, the reactor was charged with 300 ml of catalyst. 1200 ml/h of pure tetrahydrofuran (residence time 45 min) and 10 l/h of hydrogen were then fed in. The hydrogenation was in each case carried out at 60° C., a pressure of 10 bar and a residence time of 15 min. The impurities in the high-purity tetrahydrofuran are shown in Table 2.

D. Hydrogenation of Various Pure Tetrahydrofuran Grades using Catalyst A

The hydrogenation was carried out using various pure tetrahydrofuran grades which had been prepared by a method analogous to the process described in DE-A 37 26 805. The hydrogenation of these pure tetrahydrofuran grades was carried out using catalyst A in a continuously operated 1 l hydrogenation reactor.

In all experiments, the reactor was charged with 300 ml of catalyst. 1200 ml/h of pure tetrahydrofuran (residence 45 min) and 10 l/h of hydrogen were then fed in. The hydrogenation was in each case carried out at 60° C., a pressure of 10 bar and a residence time of 15 min. The impurities in the high-purity tetrahydrofuran are shown in Table 3.

TABLE 1

Hydrogenation of THF using catalyst A under various conditions:

| | MAC | n-BA | i-BA | 2,3-DHF | 2,5-DHF | THF-HP | Others |
|---|---|---|---|---|---|---|---|
| 30° C., 10 bar, 15 min res. time | 11 ppm | 4 ppm | <1 ppm | 4 ppm | 5 ppm | <1 ppm | 41 ppm |
| 50° C., 10 bar, 15 min res. time | <1 ppm | <1 ppm | <1 ppm | <1 ppm | <1 ppm | <1 ppm | 55 ppm |
| 70° C., 10 bar, 15 min res. time | <1 ppm | <1 ppm | <1 ppm | <1 ppm | <1 ppm | <1 ppm | 71 ppm |
| 100° C., 10 bar, 15 min res. time | <1 ppm | <1 ppm | <1 ppm | <1 ppm | <1 ppm | <1 ppm | 366 ppm |
| 70° C., 100 bar, 15 min res. time | <1 ppm | <1 ppm | <1 ppm | <1 ppm | <1 ppm | <1 ppm | 47 ppm |
| 70° C., 10 bar, 45 min res. time | <1 ppm | <1 ppm | <1 ppm | <1 ppm | <1 ppm | <1 ppm | 734 ppm |

TABLE 1-continued

Hydrogenation of THF using catalyst A under various conditions:

|  | MAC | n-BA | i-BA | 2,3-DHF | 2,5-DHF | THF-HP | Others |
|---|---|---|---|---|---|---|---|
| 70° C., 10 bar, 15 min res. time | <1 ppm | <1 ppm | <1 ppm | <1 ppm | <1 ppm | <1 ppm | 79 ppm |
| 70° C., 10 bar, 5 min res. time | <1 ppm | <1 ppm | <1 ppm | <1 ppm | <1 ppm | <1 ppm | 41 ppm | methacrolein = MAC
n-butyraldehyde = n-BA
isobutyraldehyde = i-BA
2,3-dihydrofuran = 2,3-DHF
2,5-dihydrofuran = 2,5-DHF
THF hydroperoxide = THF-HP
res. time = residence time

TABLE 2

Hydrogenation of THF using various catalysts:
Hydrogenation conditions: Temperature: 60° C.
Pressure: 10 bar
Residence time 15 min

|  | MAC | n-BA | i-BA | 2,3-DHF | 2,5-DHF | THF-HP | Others |
|---|---|---|---|---|---|---|---|
| Catalyst A | <1 ppm | <1 ppm | <1 ppm | <1 ppm | <1 ppm | <1 ppm | 62 ppm |
| Catalyst B | <1 ppm | <1 ppm | <1 ppm | <1 ppm | <1 ppm | <1 ppm | 81 ppm |
| Catalyst C | <1 ppm | <1 ppm | <1 ppm | <1 ppm | <1 ppm | <1 ppm | 62 ppm |
| Catalyst D | <1 ppm | <1 ppm | <1 ppm | <1 ppm | <1 ppm | <1 ppm | 54 ppm |
| Catalyst E | <1 ppm | <1 ppm | <1 ppm | <1 ppm | <1 ppm | <1 ppm | 61 ppm |
| Catalyst F | <1 ppm | <1 ppm | <1 ppm | <1 ppm | <1 ppm | <1 ppm | 44 ppm | methacrolein = MAC
n-butyraldehyde = n-BA
isobutyraldehyde = i-BA
2,3-dihydrofuran = 2,3-DHF
2,5-dihydrofuran = 2,5-DHF
THF hydroperoxide = THF-HP

TABLE 3

Hydrogenation of various THF grades using catalyst A:
Hydrogenation conditions: Temperature: 60° C.
Pressure: 10 bar
Residence time 15 min

| | MAC | | n-BA | | i-BA | | 2,3-DHF | | 2,5-DHF | | THF-HP | | Others | |
|---|---|---|---|---|---|---|---|---|---|---|---|---|---|---|
| | Before | After | Before | After | Before | After | Before | After | Before | After | Before | After | Before | After |
| THF 1 | 25 | <1 | 11 | <1 | 8 | <1 | 12 | <1 | 6 | <1 | 3 | <1 | 21 | 62 |
| THF 2 | 33 | <1 | 12 | <1 | 15 | <1 | 5 | <1 | 4 | <1 | 1 | <1 | 54 | 104 |
| THF 3 | 9 | <1 | 7 | <1 | 9 | <1 | 5 | <1 | 4 | <1 | 5 | <1 | 32 | 95 | methacrolein = MAC
n-butyraldehyde = n-BA
isobutyraldehyde = i-BA
2,3-dihydrofuran = 2,3-DHF
2,5-dihydrofuran = 2,5-DHF
THF hydroperoxide = THF-HP E: Preparation of PTHF using High-Purity THF High-purity THF was used directly after the hydrogenation according to the present invention, without intermediate storage, for the preparation of PTHF by the general method described below. The polymerization results achieved according to the present invention using this high-purity THF (Examples 1, 2 and 3) were compared with the achievable results when using, in contrast to the process of the present invention, THF grades having purities of >99.9% which had not been hydrogenated prior to the polymerization.

Polymerization of THF

The experiments on the polymerization of THF were carried out in a continuously operated circulation apparatus. In all experiments, the reactor was charged with 250 ml of montmorillonite catalyst (K 306 from Südchemie). The apparatus was then charged with a mixture of 600 g of THF of the grade indicated in Table 4 and 42 g of acetic anhydride. The mixture was then passed over the catalyst from the top downward (downflow mode). After a residence time of 10 hours at 45° C., the reaction was stopped. After unreacted THF had been separated off by distillation, the conversion in the reaction and the color number of the PTHF diacetate formed were measured.

The determination of color numbers is described in the standards DIN 53 409 and ASTM -S-1209.

The results of the polymerizations and the impurities in the THF grades used are shown in Table 4.

TABLE 4

Preparation of PTHF using high-purity THF

| THF | Comparative Example 1 | Example 1 | Comparative Example 2 | Example 2 | Comparative Example 3 | Example 3 |
|---|---|---|---|---|---|---|
| MAC | 25 | <1 | 33 | <1 | 9 | <1 |
| n-BA | 11 | <1 | 12 | <1 | 7 | <1 |
| i-BA | 8 | <1 | 15 | <1 | 9 | <1 |
| 2,3-DHF | 12 | <1 | 5 | <1 | 5 | <1 |
| 2,5-DHF | 6 | <1 | 4 | <1 | 4 | <1 |
| THFP-HP | 3 | <1 | 1 | <1 | 5 | <1 |
| Others [ppm] | 21 | 62 | 54 | 104 | 32 | 95 |
| Color number of PTHF [Apha] | 28 | 6 | 44 | 4 | 25 | 4 | methacrolein = MAC
n-butyraldehyde = n-BA
isobutyraldehyde = i-BA
2,3-dihydrofuran = 2,3-DHF
2,5-dihydrofuran = 2,5-DHF
THF hydroperoxide = THF-HP

We claim:

1. A process for preparing polytetrahydrofuran, tetrahydrofuran copolymers, their monoesters or diesters and the monoesters or diesters of polytetrahydrofuran having a low color number in the presence of a catalyst, which comprises converting crude tetrahydrofuran which has been prepared in a manner known per se into pure tetrahydrofuran by distillation, subsequently subjecting the latter to essentially complete hydrogenation over a catalyst comprising transition metals of groups 7 to 10 of the Periodic Table of the Elements or oxides thereof on a support selected from among aluminium oxide, silicon oxide, pumice, bentonite, magnesium silicate and mixtures thereof and using the high-purity tetrahydrofuran obtained in this way for the polymerization directly after its preparation.

2. A process as claimed in claim 1, wherein the hydrogenation is carried out at from 20 to 300° C., preferably from 20 to 200° C., particularly preferably from 50 to 100° C., and a pressure of from 1 to 300 bar, preferably from 1 to 100 bar, particularly preferably from 1 to 20 bar.

3. A process as claimed in claim 1, wherein the polymerization is carried out by means of acetic anhydride and both the pure tetrahydrofuran and the acetic anhydride are hydrogenated together or separately prior to the polymerization.

4. A process as claimed in claim 1, wherein the polymerization is carried out in the presence of at least one telogen and/or comonomer.

5. A process as claimed in claim 1, wherein tetrahydrofuran which has been separated off after the polymerization and recirculated is mixed with fresh pure tetrahydrofuran and passed to hydrogenation and reused for the polymerization.

* * * * *